UNITED STATES PATENT OFFICE.

MAX BUCHNER, OF MANNHEIM-WALDHOF, GERMANY.

TREATMENT OF CORUNDUM.

No. 848,439.  Specification of Letters Patent.  Patented March 26, 1907.

Application filed January 15, 1906. Serial No. 296,211.

*To all whom it may concern:*

Be it known that I, MAX BUCHNER, a subject of the German Emperor, residing at Mannheim-Waldhof, Grand Duchy of Baden, Germany, have invented new and useful Improvements in the Treatment of Corundum; and I do hereby declare that the following is a full, clear, and exact description of the invention, which will enable others skilled in the art to which it appertains to make and use the same.

Corundum has already been used with clay binding substances for the manufacture of clay ware of all kinds, and in particular ware designed for employment in the chemical industries. It is a curious fact that goods so made when burned have imparted to them the physical, mechanical, and chemical properties innate in the corundum—as, for example, the extraordinary mechanical rigidity, constancy of volume, difficulty in melting, and resistance to the action of acids and chemical influences. The behavior of the corundum mass is the more surprising since the corundum, in spite of the properties above mentioned, enters into intimate connection with the binding material without the occurrence of any noticeable chemical reaction. These corundum masses resist the action of hot concentrated alkalies for a time, but not for any considerable length of time. They are only relatively resistant against hot alkaline solutions and molten alkalies, as in both cases the clay binding material is attacked.

The technical manufacture and treatment of corundum masses offers few technical difficulties in so far as it is a question of the production of masses which do not contain a high percentage of corundum. These difficulties, however, become greater as the percentage of corundum in the mass increases.

Now this invention is based upon the observation that corundum, natural, artificial, or molten aluminium oxid or ceramic masses made therefrom are not at very high temperatures—for example, thirty-saggar cone (in contradistinction to fire-brick containing a high percentage of alumina and the like) altered chemically and physically by basic materials, such as cement and lime or smelted under continual high temperatures. The intimate attachment of these materials in thin layers without alteration of the corundum mass suggested that corundum—that is to say, natural, artificial, or molten aluminium oxid—should be mixed with these materials, molded, and burned.

I am aware that it is not new to mix corundum with cementitious binding materials for the manufacture of grinding-disks or for lining safes; but these substances were neither subjected to a burning process nor has it been hitherto observed that the cementitious material remains attached to the corundum in a thin layer without altering the latter so that such masses are suitable for casting—that is to say, that the masses or articles so manufactured or molded show the same properties as the corundum even when they are subjected to the highest temperatures obtained from chemical sources of heat in the ordinary chemical, metallurgical, ceramic, and other industries.

The masses obtained by the mixture of Roman or Portland cement with water and corundum are not only capable of being molded, but can be cast with facility in wooden or metal molds, which is a considerable technical advance as compared with the manufacture of ceramic masses of corundum and clay binding substances. In this connection it is immaterial whether the corundum is added in the finely-ground or in the granular condition or in small or large proportions. Furthermore, masses made with water-hardening binding materials are porous after burning and are not only relatively resistant to the action of acids, but also resistant to alkalies, so that they are not attacked even after being boiled for hours in concentrated alkaline lyes, this property being of great importance, among other things, in the manufacture of alkali-proof diaphragms. It is also found that gypsum may be used in lieu of cement and lime. The masses are suitable for the manufacture by molding and burning of all kinds of implements—vessels and articles for the chemical, metallurgical, and other industries. They can also be employed for coatings and linings, &c., for metals as a protection against all kinds of chemical and physical influences. Moreover, they are suitable for use as protective coatings for fireproof and chemically and physically durable cements.

It is a well-known fact that alumina in the form in which it is brought into commerce is soluble in acid. It, however, loses this property as soon as it is fused. I have found that this property possessed by alumina also occurs in the alkaline earth. For example, a highly-heated mixture of alumina oxid and calcium oxid is also resistant to acids. This property I use for the manufacture of articles of all kinds by converting fused aluminium oxid with mixtures of alkaline earths into a moldable mass which can be used for a variety of purposes—as, for example, mortar, vessels, cements, coatings, &c—and is resistant to acids in the heated condition.

Having now particularly described and ascertained the nature of my said invention and in what manner the same is to be performed, I declare that what I claim is—

1. A method of treating corundum with a cementitious binding material, which hardens with water, for the manufacture of ceramic masses, such method consisting in mixing the corundum with the cementitious material, shaping it and burning the same, substantially as described.

2. A method of treating corundum with a cementitious binding material, which hardens with water, for the manufacture of ceramic masses, such method consisting in mixing the corundum with cement, shaping the mass and burning the same, substantially as described.

3. A method of treating corundum with a cementitious binding material, which hardens with water, for the manufacture of ceramic masses, such method consisting in mixing the corundum with Portland cement, shaping the mass and burning the same, substantially as described.

MAX BUCHNER.

Witnesses:
H. W. HARRIS,
JOS. H. LEUTE.